United States Patent
Kamprath et al.

(10) Patent No.: US 10,922,615 B1
(45) Date of Patent: Feb. 16, 2021

(54) INFERRING THE PRESENCE OF AN ENTITY WITHIN AN IDENTIFIER SPACE BASED ON THE BEHAVIORS OF UNRELATED ENTITIES

(71) Applicant: Quantcast Corporation, San Francisco, CA (US)

(72) Inventors: Michael F. Kamprath, Mountain View, CA (US); Sean McCormick, Oakland, CA (US); Wayne Steven Yang, San Jose, CA (US)

(73) Assignee: Quantcast Corporation, San Francisco, CA (US)

( * ) Notice: Subject to any disclaimer, the term of this patent is extended or adjusted under 35 U.S.C. 154(b) by 1323 days.

(21) Appl. No.: 15/051,531

(22) Filed: Feb. 23, 2016

Related U.S. Application Data

(63) Continuation of application No. 14/752,013, filed on Jun. 26, 2015, now Pat. No. 9,330,361, which is a continuation of application No. 13/931,586, filed on Jun. 28, 2013, now Pat. No. 9,159,029.

(51) Int. Cl.
*G06N 7/00* (2006.01)
*H04L 29/08* (2006.01)

(52) U.S. Cl.
CPC ............. *G06N 7/005* (2013.01); *H04L 67/02* (2013.01)

(58) Field of Classification Search
None
See application file for complete search history.

(56) References Cited

U.S. PATENT DOCUMENTS

| | | | |
|---|---|---|---|
| 7,856,373 B2 | 12/2010 | Ullah | |
| 2004/0003042 A1 | 1/2004 | Horvitz et al. | |
| 2009/0298514 A1 | 12/2009 | Ullah | |
| 2012/0100867 A1 | 4/2012 | Liang et al. | |
| 2012/0100869 A1 | 4/2012 | Liang et al. | |
| 2013/0097158 A1* | 4/2013 | Pobbathi | G06F 16/9535 707/723 |
| 2013/0124309 A1 | 5/2013 | Traasdahl et al. | |
| 2013/0124315 A1 | 5/2013 | Doughty et al. | |
| 2013/0262225 A1 | 10/2013 | Ahrens et al. | |
| 2014/0207567 A1 | 7/2014 | Gould et al. | |
| 2014/0365296 A1 | 12/2014 | McDonnell et al. | |

\* cited by examiner

*Primary Examiner* — Li B. Zhen
*Assistant Examiner* — Mikayla Chubb
(74) *Attorney, Agent, or Firm* — Robin W. Reasoner; Andrea Wheeler

(57) ABSTRACT

Embodiments of the invention build models to predict the likelihood of entities that operate in a given identifier space also operating in a disjoined identifier space based on a source panel of entities that operate in one or both of the identifier spaces. In operation, a model building engine builds a model based on features associated with the source panel and features associated with standard populations in the given identifier space. The model is used to determine whether the target entity is more similar to those entities in the source panel that operate only in the given identifier space or those entities in the source panel that operate in both identifier spaces.

20 Claims, 5 Drawing Sheets

INFERRING THE PRESENCE OF AN ENTITY WITHIN AN IDENTIFIER SPACE BASED ON THE BEHAVIORS OF UNRELATED ENTITIES

CROSS-REFERENCE TO RELATED APPLICATION(S)

This application is a continuation of U.S. application Ser. No. 14/752,013 entitled "Inferring the Presence of an Entity Within an Identifier Space Based on the Behaviors of Unrelated Entities," by Michael Kamprath, Sean McCormick, and Wayne Yang, filed on Jun. 26, 2015, which is a continuation application of U.S. application Ser. No. 13/931,586 entitled "Inferring the Presence of an Entity Within an Identifier Space Based on the Behaviors of Unrelated Entities," by Michael Kamprath, Sean McCormick, and Wayne Yang, filed on Jun. 28, 2013, which is hereby incorporated by reference in its entirety.

BACKGROUND

1. Technical Field

This invention pertains in general to modeling behavior of entities, and in particular to inferring the presence of an entity within an identifier space based on the behavior of unrelated entities.

2. Description of Related Art

In recent times, entities access and interact with the digital content from within several operating environments, such as the internet, mobile devices, gaming consoles, etc. In each operating environment, information related to the entities, such as content consumption habits, may be captured. Such information can then be used by various organizations, such as ad marketers, to better serve content to the entities.

One major hurdle in using the information captured for different entities is that operating environments are often disparate from one another. Specifically, information captured for an entity operating in one operating environment cannot seamlessly be attributed to that entity in a second, different operating environment. Therefore, intelligent decisions regarding what content to serve to the entity in the second operating environment cannot be made on the existing information. In such situations, a mechanism that enables the use of existing information for inferring information in a disparate operating environment is desired.

SUMMARY

Embodiments of the invention include a method, a non-transitory computer readable storage medium and a system for determining the likelihood of an entity that operates in a first identifier space also operating in a second identifier space. Different models are built based on features associated with a source panel of entities, at least a subset of entities in the source panel operating in the both the first identifier space and the second identifier space. A model is built to determine the likelihood of entities that operate in the first identifier space also operating in the second identifier space. The model is applied to a history associated with a target entity that operates in the first identifier space to compute a score indicating the likelihood of the target entity also operating in the second identifier space.

Embodiments of the computer-readable storage medium store computer-executable instructions for performing the steps described above. Embodiments of the system further comprise a processor for executing the computer-executable instructions.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

Figure 1:
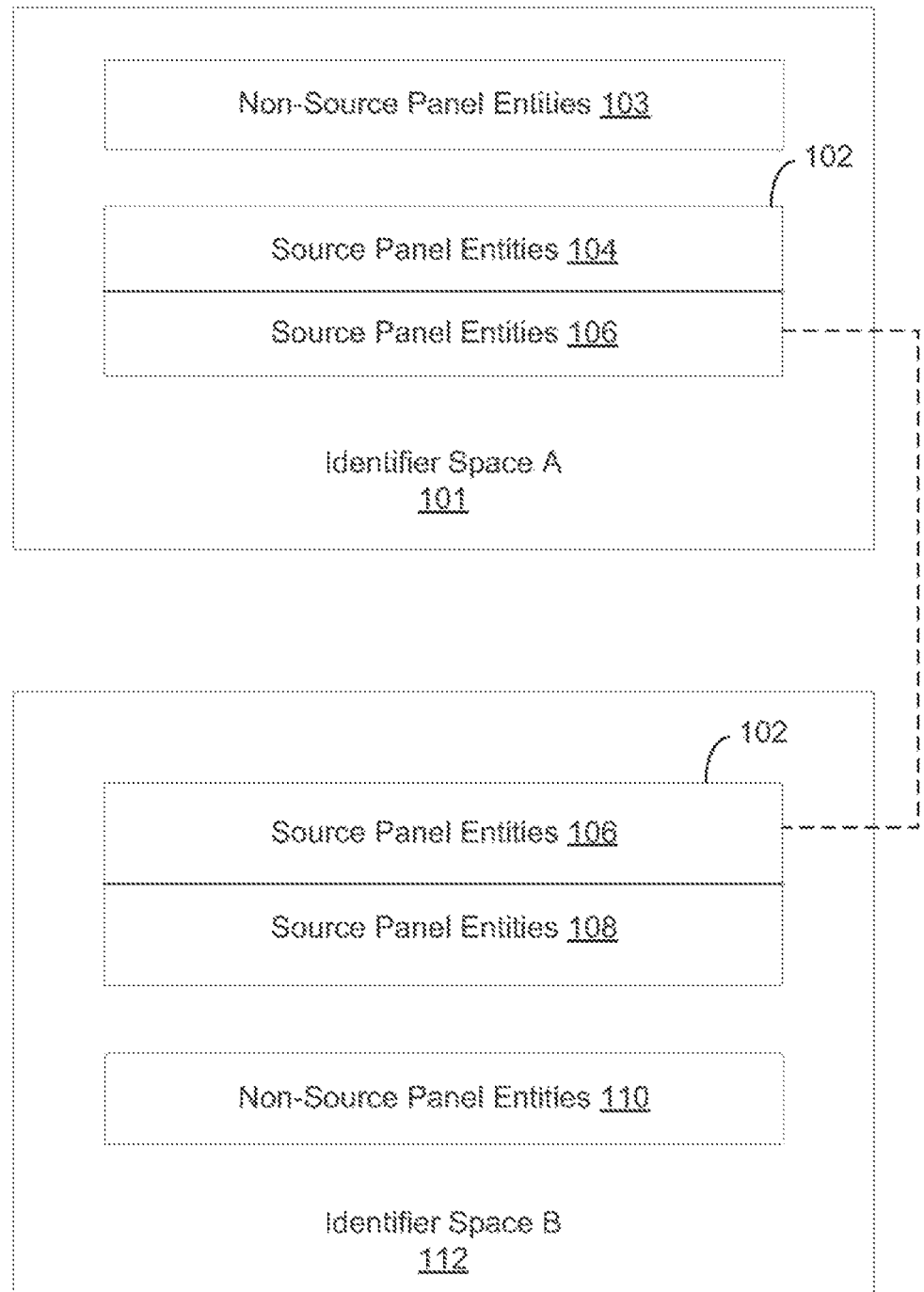
FIG. 1 illustrates two disjoined identifier spaces, identifier space A and identifier space B, in accordance with an embodiment of the invention.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Embodiments of the invention build models to predict the likelihood of entities that operate in a given identifier space also operating in a different identifier space based on a source panel of entities that operate in one or both of the identifier spaces.

Entities and Identifier Spaces

An identifier space is an environment in which one or more entities operate, where each entity is associated with an entity identifier specific to that identifier space. The entity identifier may be unique. The identifier associated with an entity is anonymized, such that the identifier does not reveal the true identity of the entity. An entity identifier associated with an entity and specific to an identifier space does not readily map to an identifier associated with that entity and specific to a different identifier space. Identifier spaces include internet browsers (referred to herein as "the internet"), mobile systems, digital television systems, gaming systems, in-vehicle systems, platform user logins and offline spaces, such as grocery store affinity cards.

For each entity operating in an identifier space, a history is collected and recorded in association with the entity identifier associated with the entity. A history for a particular entity may include an interaction history that provides information related to the entity's acts, interactions and other behaviors within the identifier space. A history may also include a media consumption history that provides information related to the entity's acts of accessing content from within the identifier space. Identifiers associated with the same entity across different identifier spaces are typically not mapped to each other, making the identifier spaces disjoined. Consequently, the same entity may operate in two disjoined identifier spaces, but the history of that entity in one identifier space cannot be attributed to that entity in the second identifier space without an explicit mapping between the identifiers associated with the entity.

A variety of methods exist for associating an identifier with an entity in an identifier space. For example, an identifier may be a hardware device identifier, such as a Media Access Control Address (MAC address), that can be stored on a device operated by an entity to access content over a network. As another example, a software identifier such as a cookie value can be locally stored. In other embodiments, identifiers can be composed and/or stored remotely from a device associated with the entity. In some cases, a browser being operated by the entity can have multiple identifiers, such as multiple first party cookies and multiple third party cookies, which can be used to identify the browser to various systems.

In the mobile identifier space, an entity identifier may be a device identifier of a mobile device on which several mobile applications are installed. The histories associated with each of the mobile applications may all be associated with the same device identifier. In alternative embodiments, each mobile application or a group of mobile applications installed on a mobile device may be associated with a different identifier within the mobile identifier space. Consequently, each mobile application or group of mobile applications operates as a separate entity, and the histories associated with all mobile applications installed on the mobile device are not associated with the same identifier. In such embodiments, each mobile application or group of mobile applications may operate in separate identifier subspaces within the mobile identifier space.

Figure (FIG. 1 illustrates two disjoined identifier spaces, identifier space A 101 and identifier space B 112, in accordance with an embodiment of the invention. As shown, the identifier space A 101 includes a portion of a source panel 102 and non-source panel entities 103, and identifier space B 112 includes a portion of the source panel 102 and non-source panel entities 110.

Identifier space A 101 and identifier space B 112 are disjoined identifier spaces in which entities operate. The non-source panel entities 103 is a set of entities that operates at least within the identifier space A 101. Because identifiers of the non-source panel entities 103 in the identifier space A 101 are generally not mapped to identifiers in the identifier space B 112, it is unknown how many, if any, of the members of the non-source panel entities 103 also operate within the identifier space B 112. Similarly, the non-source panel entities 110 is a set of entities that operates at least within the identifier space B 112. As with the non-source panel entities 103, it is unknown how many, if any, of the members of the non-source panel entities 110 also operate within the identifier space A 101.

The source panel 102 is a set of entities that each operates in one or both of identifier space A 101 and identifier space B 112. Source panel entities 104 are entities in the source panel 102 that operate only in identifier space A 101. Source panel entities 108 are entities in the source panel 102 that operate only in identifier space B 112. Source panel entities 106 are entities in the source panel 102 that operate in both identifier space A 101 and identifier space B 112. In one embodiment, the operation of entities in the source panel 102 across identifier space A 101 and identifier space B 112 is affirmatively known. In an alternate embodiment, the operation of entities in the source panel 102 across identifier space A 101 and identifier space B 112 is known through an inferential analysis.

For each entity in the source panel 102 that operates in both identifier space A 101 and identifier space B 112, i.e., source panel entities 106, the associated identifier specific to identifier space A 101 is mapped to the associated identifier specific to identifier space B 112. Therefore, the history of the entity in identifier space A 101 can be attributed to that entity in identifier space B 112 and vice versa.

In one embodiment, source panel entities 106 may be determined because each entity in the source panel entities 106 is associated with an anonymous identifier that is applied to the entity in both identifier space A 101 and identifier space B 112. Specifically, for each entity in the source panel entities 106, both the identifier specific to identifier space A 101 and the identifier specific to identifier space B 112 are linked to the anonymous identifier. In another embodiment, an entity in the source panel entities 106 may be determined based on probabilistic knowledge indicating that the entity operates in both identifier space A 101 and identifier space B 112. For example, the entity may have accessed a mobile application on a mobile device and a web page via a web browser from a different device from the same geographic location. The entity is then probabilistically known to operate in both the mobile identifier space and the internet identifier space. Other mechanisms for determining entities that operate in both identifier space A 101 and identifier space B 112 are within the scope of this invention.

For an entity outside of the source panel 102 that operates in both identifier spaces, the associated identifier specific to identifier space A 101 may not be mapped to the associated identifier specific to identifier space B 112. Consequently, the history of that entity in identifier space A 101 may not automatically be attributed to that entity in identifier space B 112 and vice versa. Therefore, even though that entity operates in both identifier space A 101 and identifier space B 112, that information may not be readily available to interested parties.

The discussion below describes techniques for determining the likelihood that an entity that operates in identifier space A 101 also operates in identifier space B 112 based on the similarities between the entity and entities in the source panel 102.

Server System

Figure 2:
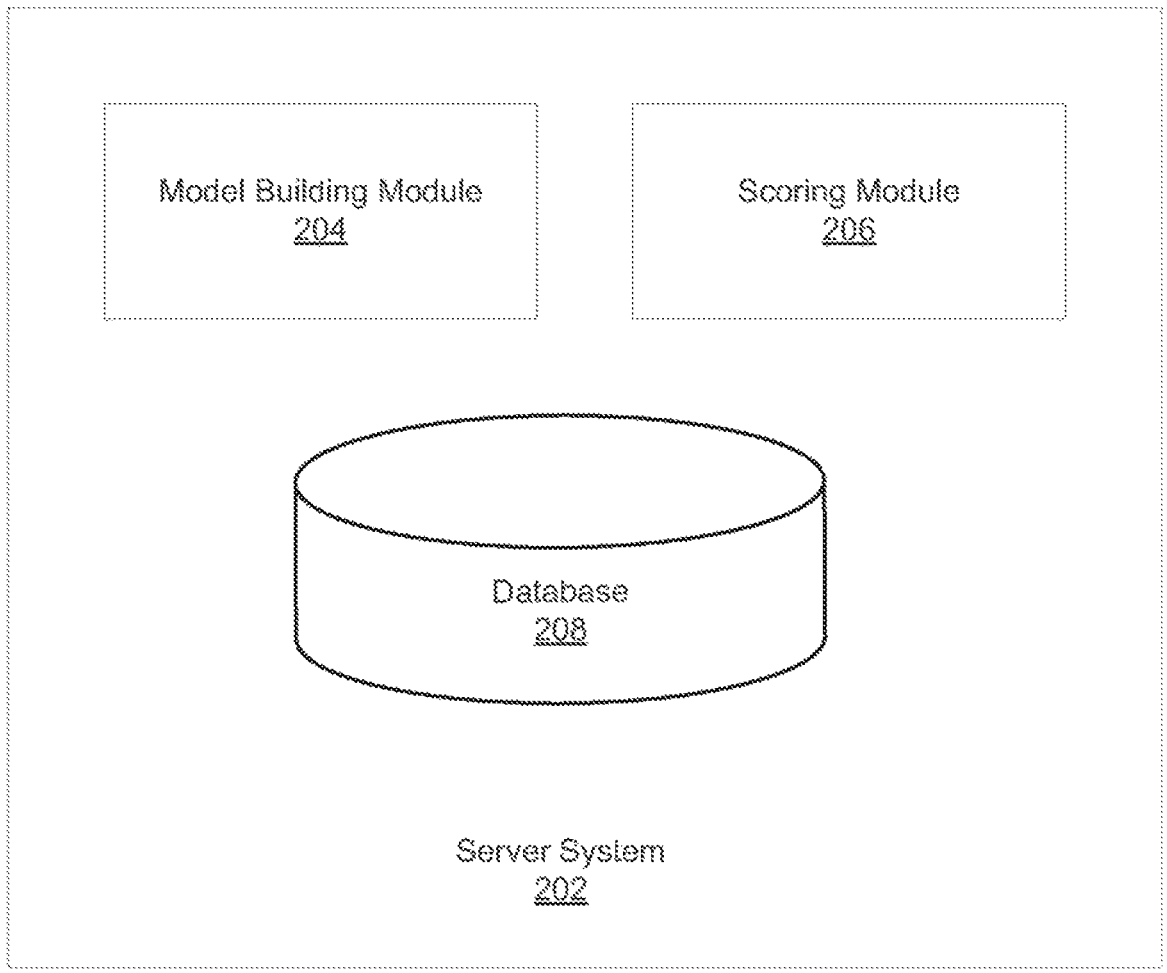
FIG. 2 is a high-level block diagram of a server system, in accordance with an embodiment of the invention.

FIG. 2 is a high-level block diagram of a server system 202, in accordance with an embodiment. The server system 202 stores histories of entities, builds models to predict the similarity between different entities, and applies a model to an entity's history. In some embodiments, the server system 202 is implemented as a single server, while in other embodiments it is implemented as a distributed system of multiple servers. For convenience of explanation, the server system 202 is described below as being implemented on a single server system. The server system 202 includes a model building module 204, a scoring module 206 and a database 208.

The database 208 stores data needed by the server system 202 to build models and score the histories of entities based on those models. In operation, the database 210 records events in conjunction with an identifier, such as a cookie value. An event may be the act by an entity of accessing content over a network, such as, but not limited to, accessing a web page from a web server. An event may also be a status of an application executing on a device operated by the entity. The database 210 may also record supplemental data in conjunction with an event, such as the browser that was being used by the entity, the operating system that operates the browser as well as other characteristics of the computer system that operates the browser (e.g., screen resolution), any of which may be used as features in a model, as will be discussed below.

The database 208 is shown as internal to the server system 202, but in other implementations, database 208 may be external to or remote from the server system 202. Also, only one instance of database 208 is shown in FIG. 2 for clarity, but in practice, the histories may be stored in a plurality of databases, such as a distributed network of storage facilities.

The model building module 204 builds models for predicting the similarity between entities and different archetypical populations within an identifier space. To build a model, the model building module 204 identifies an archetypical population from the entities operating in an identifier space based on pre-defined criteria. Such criteria may be tied to an advertising campaign and/or defined by a marketer in conjunction with the advertising campaign. Examples of criteria include entities within particular geographic boundaries, entities that access a particular type of content, entities that have purchased a particular item or type of item, etc. In one embodiment, model building module 204 uses the pre-defined criteria to create a filter such that only entities operating in the identifier space that fulfill the criteria pass the filter.

The model building module 204 also identifies a standard population, i.e., entities operating in the identifier space that are to be used for comparison purposes against the archetypical population. The standard population may be a general, or baseline population that does not meet the criteria defined for the archetypical population. In many cases, the archetypical population may be dwarfed by the size of the standard population such that it is not practical or efficient to analyze the entire standard population. For convenience, the standard population may be down-sampled according to any technique known in the art to avoid having to manipulate massive amounts of data. In certain cases, the identified standard population may include entities present in the archetypical population. In such a case, because the standard population is typically much larger than the archetypical population, the entities in the standard population that are also present in the archetypical population are not excluded from the standard population.

To build the model, the model building module 204 optionally extracts and selects features from the histories and other data from the database 208 that occur in the archetypical population with a frequency that is different from the standard population. The selected features may be positively or negatively correlated to being in the archetypical population as opposed to the standard population. In operation, the model building module 204 translates the data from the database 208 into a set of many features. For example, the features of a history may include websites visited, keyword searches entered, online purchases made, geographic location, topics from past ad opportunities, type of browser, etc.

Once the model building module 204 has translated the data from the database 208 into a set of many features, the model building module 204 optionally determines which features are most strongly correlated with being in the archetypical population versus the standard population and uses those features to form the model. In other embodiments, feature selection need not be performed, particularly if there are no limitations on storage space for models.

In alternative embodiments, statistics for the general population, such as census data, may be used to form the standard population. In such embodiments, to build the model, the model building module 204 optionally extracts and selects features from the histories and other data from the database 208 that are the most strongly correlated to being in the archetypical population as opposed to features of the general population as provided by the statistics.

The scoring module 206, in general, computes a score for an entity by analyzing events in the history of the entity against features of a model. The score quantifies the similarity between the entity and the archetypical population used to build the model. Specifically, the scoring module 206 scores an entity's history based on which features in the feature set of the applicable model are present in the entity's history.

Building Models Based on the Source Panel

Figure 3:
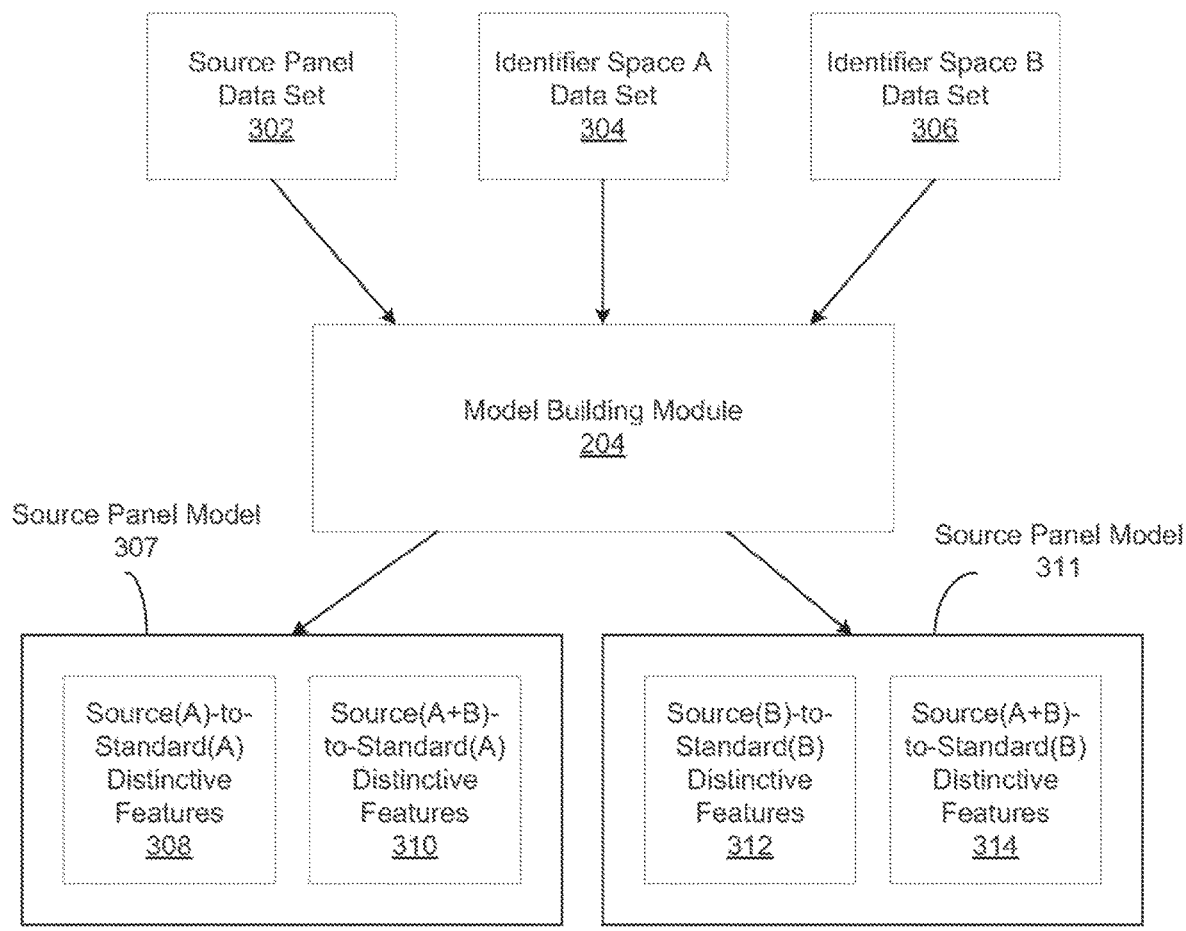
FIG. 3 illustrates data sets as input to the model building module of FIG. 2 that generates four models related to the source panel of FIG. 1, in accordance with an embodiment.

FIG. 3 illustrates data sets as input to the model building module 204 of FIG. 2 that generates four models related to the source panel 102 of FIG. 1, in accordance with an embodiment. As shown, the model building module 204 takes as inputs a source panel data set 302, identifier space A data set 304 and identifier space B data set 306. Based on the inputs, the model building module 204 generates two source panel models, the source panel model 307 and the source panel model 311.

The identifier space A data set 304 includes histories and other data from the database 208 associated with entities operating in identifier space A 101. The identifier space B data set 306 includes histories and other data from the database 208 associated with entities operating in identifier space B 112. The source panel data set 302 includes histories and other data from the database 208 associated with entities in the source panel 102 and related to both identifier space A 101 and identifier space B 112. As discussed above, for each entity in the source panel 102 that operates in both identifier space A 101 and identifier space B 112, the associated identifier specific to identifier space A 101 is mapped to the associated identifier specific to identifier space B 112. Therefore, the history of the entity determined in identifier space A 101 can be attributed to that entity in identifier space B 112 and vice versa.

The model building module 206 builds the source panel model 307 based on the source panel data set 302 and the identifier space A data set 304. To build the source panel model 307, the model building module 204 identifies a standard population specific to identifier space A 101. The standard population (referred to herein as "standard A") may be a general, or baseline representative population in identifier space A 101. In such an embodiment, standard (A) may include all entities operating in identifier space A 101. In alternative embodiments, standard (A) may be determined based on general population statistics as gathered from census data. The model building module 204 then determines source (A)-to-standard (A) distinctive features 308 ("distinctive features 308") and source (A+B)-to-standard (A) distinctive feature 310 ("distinctive features 310") by comparing different subsets of the source panel 102 with the standard population specific to identifier space A 101.

In operation, to determine the distinctive features 308, the model building module 204 identifies the set of entities in the source panel 102 that operates only in identifier space A 101 (labeled as source panel entities 104 in FIG. 1 and referred to herein as "source (A)"). The model building module 204 extracts and selects features from the histories and other data from the database 208 that are the most strongly correlated to being in source (A) as opposed to standard (A). Specifically, the model building module 204 translates the data from the database 208 into a set of many features. For example, the features of a history may include websites visited, keyword searches entered, online purchases made, geographic location, topics from past ad opportunities, type of browser, etc. Once the model building module 204 has translated the data from the database 208 into a set of many features, the model building module 204 optionally determines which features are most strongly correlated with being in source (A) versus the standard population and uses those features to form the source (A)-to-standard A distinctive features 308.

Similarly, to determine the distinctive features 310, the model building module 204 identifies the set of entities in the source panel 102 that operates in both identifier space A 101 and identifier space B 112 (labeled as source panel entities 106 in FIG. 1 and referred to herein as "source (A+B)"). The model building module 204 then determines distinctive features 310 by comparing features associated with entities in source (A+B) and the standard population in the same manner as discussed above in conjunction with distinctive features 308.

The source panel model 307 is used to determine the likelihood that a particular entity operating in identifier space A 101 also operates in identifier space B 112. Specifically, the history of the entity may be compared to both distinctive features 308 and distinctive features 310 to determine whether the entity's features are more highly correlated with distinctive features 308 or distinctive features 310. If the entity's features are more highly correlated with distinctive features 308 than with distinctive features 310, then the likelihood that the entity operates in both identifier space A 101 and identifier space B 112 is low. Conversely, if the entity's features are more highly correlated with distinctive features 310 than with distinctive features 308, then the likelihood that the entity operates in both identifier space A 101 and identifier space B 112 is high.

The model building module 206 also builds the source panel model 311 based on the source panel data set 302 and the identifier space B data set 306. To build the source panel model 311, the model building module 204 identifies a standard population specific to identifier space B 112. The standard population (referred to herein as "standard B") may be a general, or baseline representative population in identifier space B 112. In such an embodiment, standard (B) may include all entities operating in identifier space B 112. In alternative embodiments, standard (B) may be determined based on general population statistics as gathered from census data. The model building module 204 then determines source (B)-to-standard (B) distinctive features 312 ("distinctive features 312") and source (A+B)-to-standard (B) distinctive feature 314 ("distinctive features 314") by comparing different subsets of the source panel 102 with the standard population specific to identifier space B 112.

In operation, to determine the distinctive features 312, the model building module 204 identifies the set of entities in the source panel 102 that operates only in identifier space B 112 (labeled as source panel entities 108 in FIG. 1 and referred to herein as "source (B)"). The model building module 204 determines distinctive features 312 by comparing features associated with entities in source (B) and standard (B) in the same manner as discussed above in conjunction with distinctive features 308. Similarly, to determine the distinctive features 314, the model building module 204 identifies the set of entities in the source panel 102 that operates in both identifier space A 101 and identifier space B 112 (labeled as source panel entities 106 in FIG. 1 and referred to herein as "source (A+B)"). The model building module 204 then determines the distinctive features 314 by comparing features associated with entities in source (A+B) and standard (B) in the same manner as discussed above in conjunction with distinctive features 308.

In one embodiment, the entities within source (A+B) used to determine distinctive features 310 for source panel model 307 are the same as the entities within source (A+B) used to determine distinctive features 314 for source panel model 311. In alternative embodiments, the entities within source (A+B) used to determine distinctive features 310 may be different from the entities within source (A+B) used to determine distinctive features 314. The different set of entities may be caused by the differences in quality of the history available for the entities in identifier space A 101 versus identifier space B 112.

The source panel model 311 is used to determine the likelihood that a particular entity operating in identifier space B 112 also operates in identifier space A 101. Specifically, the history of the entity may be compared to both distinctive features 312 and distinctive features 314 to determine whether the entity's features are more highly correlated with distinctive features 312 or distinctive features 314. If the entity's features are more highly correlated with distinctive features 312 than with distinctive features 314, then the likelihood that the entity operates in both identifier space B 112 and identifier space A 101 is low. Conversely, if the entity's features are more highly correlated with distinctive features 314 than with distinctive features 312, then the likelihood that the entity operates in both identifier space B 112 and identifier space A 101 is high.

The techniques described above may be extended to more than two identifier spaces. Specifically, the model building module 204 may use a data set associated with a source panel spread across three or more identifier spaces to build source panel models for each of the three or more identifier spaces based on the techniques described above. Consequently, the likelihood of an entity that operates in one identifier space also operating in the two or more additional identifier spaces may be determined based on the source panel models.

A major benefit of the above described techniques is that knowledge of an entity's identity and an explicit association between the identity and the entity's action is not necessary to make an inference as to the entity's operation across multiple identifier spaces. In such a manner, the privacy of individual entities is preserved while determining, with high confidence, the likelihood of the entities operating across multiple identifier spaces.

Examples of Using the Source Panel Models

The scoring engine 206 scores different entities in identifier space A 101 and identifier space B 112 using the source panel models 307 and 311. Below are different examples for using the source panel models described above to infer information regarding entities operating in one or more disjoined identifier spaces. Persons skilled in the art would recognize that these techniques may be used in other ways that are not explicitly discussed in the examples below but within the scope of the invention.

Figure 4:
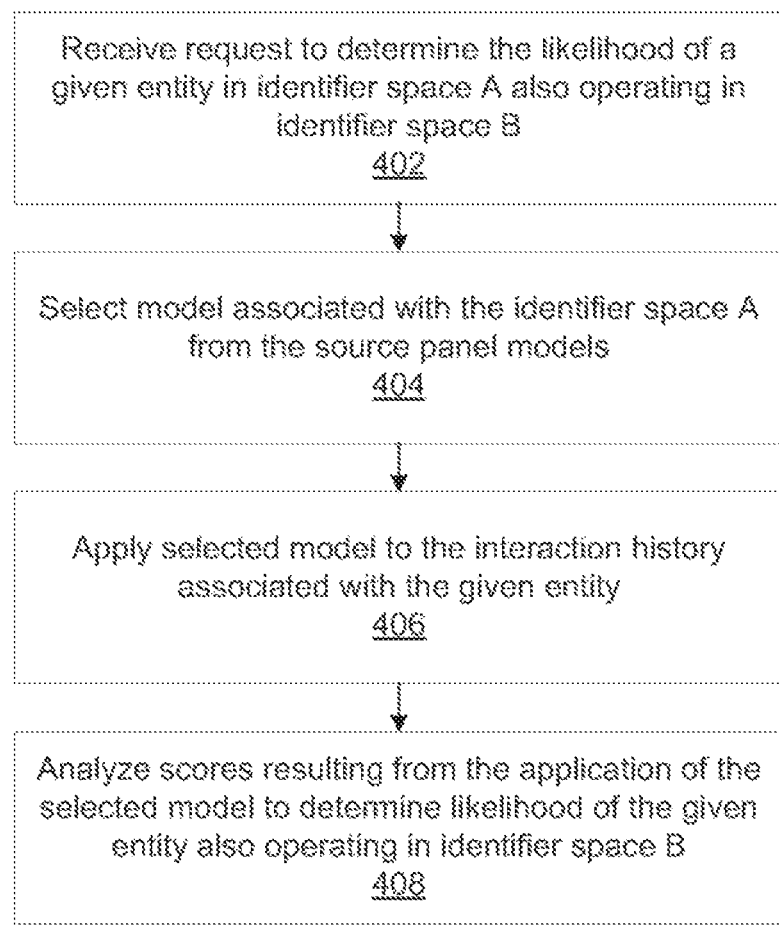
FIG. 4 is a flow chart illustrating a method of determining the likelihood of a given entity present in identifier space A also being present in identifier space B, in accordance with an embodiment of the invention.

In one example, the source panel models 307 and 311 are used to determine the likelihood of entities present in identifier space A 101 also being present in a second disjoined identifier space. FIG. 4 is a flow chart illustrating a method determining the likelihood of a given entity present in identifier space A 101 also being present in identifier space B 112. The determination of the likelihood may be performed, for example, by the scoring module 206 in the server system 202. In some implementations, the steps are performed in an order other than the order presented in FIG. 4, and in other implementations, additional or alternative steps may be performed.

At step 402, the scoring module 206 receives a request for determining the likelihood that a given entity operating in identifier space A 101 is also operating in identifier space B 112. At step 404, the scoring engine 206 selects the source panel model 307 associated with the identifier space A 101.

At step 406, the scoring engine 206 applies the selected model to the history associated with the given entity and stored in the database 208. Specifically, the scoring engine 206 analyzes events in the history of the entity against features of the source (A)-to-standard (A) distinctive features 308 to compute a score indicating the similarity between the entity and entities included in the source panel 102 that operate only in identifier space A 101. The scoring engine 206 also analyzes events in the history of the entity against features specified in the source (A+B)-to-standard (A) distinctive features 310 to compute a score indicating the similarity between the entity and entities included in the source panel 102 that operate in both identifier space A 101 and in identifier space B 112.

At step 408, the scoring engine 206 analyzes the scores resulting from the application of the selected model to determine the likelihood of the given entity that operates in identifier space A 101 also operating in identifier space B 112. Specifically, the resulting scores are compared such that a higher score resulting from the application of the source (A)-to-standard (A) distinctive features 308 indicates a higher likelihood of the entity operating only in identifier space A 101. Conversely, a higher score resulting from the application of the source (A+B)-to-standard (A) distinctive features 310 indicates a higher likelihood of the entity operating in both identifier space A 101 and identifier space B 112.

In an alternate embodiment, steps similar to steps 402-408 described above may be used to determine the likelihood of the entity that operates in identifier space B 112 also operating in identifier space A 101. In such an embodiment, the scoring engine 206 selects source panel model 311. The scoring engine 206 analyzes events in the history of the entity against features specified in the source (B)-to-standard (B) distinctive features 312 to compute a score indicating the similarity between the entity and entities included in the source panel 102 that operate only in identifier space B 112. The scoring engine 206 also analyzes events in the history of the entity against features of the source (A+B)-to-standard (B) distinctive features 314 to compute a score indicating the similarity between the entity and entities included in the source panel 102 that operate in both identifier space A 101 and in identifier space B 112. The scores can then be compared to determine the likelihood of the entity that operates in identifier space B 112 also operating in identifier space A 101.

In another example, the source panel models 307 and 311 are used to determine the distribution of a particular group of entities across two disjoined identifier spaces. For example, for a particular group of entities that use an application in identifier space A 101, the source panel model 307 is used by the scoring engine 206 to infer the number of entities in that group that also operate in identifier space B 112. Similarly, for a particular group of entities that access a website in identifier space B 112, the source panel model 311 is used by the scoring engine 206 to infer the number of entities in that group that also operate in identifier space A 101. In such an example, identifier space A 101 may be the mobile identifier space and identifier space B 112 may be the internet identifier space.

In another example, the source panel models 307 and 311 are used to control the frequency with which advertisements are exposed to a particular entity. Specifically, the source panel models 307 and 311 may be used to determine the likelihood that a particular entity operates in both identifier space A 101 and identifier space B 112. If an entity that operates in identifier space A 101 has a very low probability of operating in identifier space B 112, then the entity should be exposed to a particular advertisement in identifier space A 101 with a frequency of X. However, if the entity that operates in identifier space A 101 has a high probability of operating in identifier space B 112, then the entity should be exposed to the advertisement in identifier space A 101 with a frequency that is fraction of X (e.g., 0.5X) to avoid the same entity being exposed to the same advertisement in different identifier spaces at a much higher frequency than desired.

In another example, the source panel models 307 and 311 are used to control the types of advertisements that are exposed to a particular entity. Specifically, an advertisement that is related to content specific to one identifier space should only be served to entities that operate in the identifier space. Consequently, if an entity that operates in identifier space A 101 has a very low probability of operating in identifier space B 112, then the entity should not be exposed in identifier space A 101 to an advertisement having content specific to identifier space B 112. However, if the entity that operates in identifier space A 101 has a high probability of operating in identifier space B 112, then the entity can be exposed in identifier space A 101 to an advertisement having content specific to identifier space B 112.

Physical Components of a Computer

Figure 5:
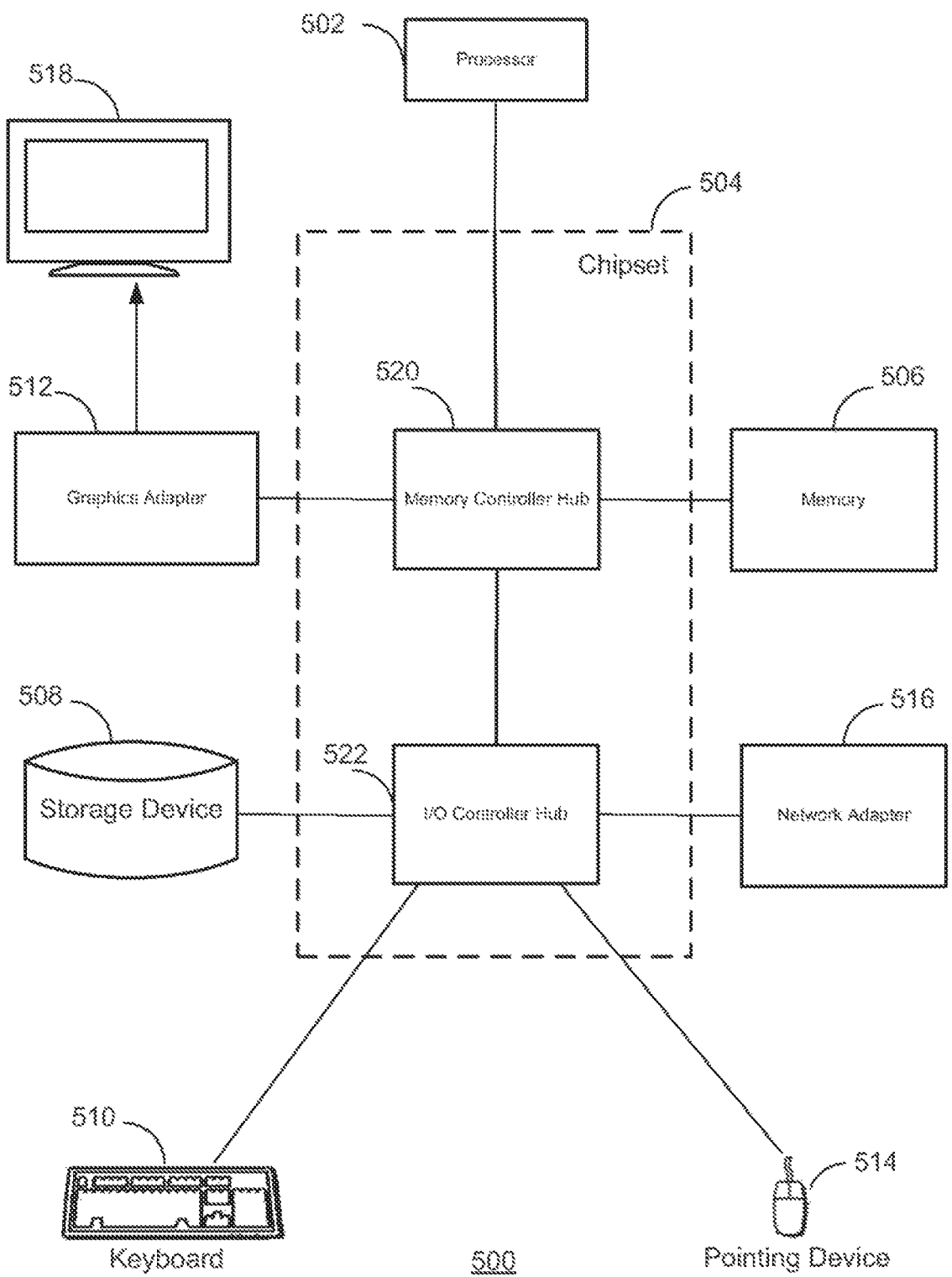
FIG. 5 is a high-level block diagram of the components of a computing system for use, for example, as the server system depicted in FIG. 1, in accordance with an embodiment.

FIG. 5 is a high-level block diagram of the components of a computing system 500 for use, for example, as the server system 202 depicted in FIG. 2, in accordance with an embodiment. Illustrated are at least one processor 502 coupled to a chipset 504. Also coupled to the chipset 504 are a memory 506, a storage device 508, a keyboard 510, a graphics adapter 512, a pointing device 514, and a network adapter 516. A display 518 is coupled to the graphics adapter 512. In one embodiment, the functionality of the chipset 504 is provided by a memory controller hub 520 and an I/O controller hub 522. In another embodiment, the memory 506 is coupled directly to the processor 502 instead of the chipset 504.

The storage device 508 is any non-transitory computer-readable storage medium, such as a hard drive, compact disk read-only memory (CD-ROM), DVD, or a solid-state memory device. The memory 506 holds instructions and data used by the processor 502. The pointing device 514 may be a mouse, track ball, or other type of pointing device, and is used in combination with the keyboard 510 to input data into the computer 500. The graphics adapter 512 displays images and other information on the display 518. The network adapter 516 couples the computer 500 to a network.

As is known in the art, a computer 500 can have different and/or other components than those shown in FIG. 5. In addition, the computer 500 can lack certain illustrated components. In one embodiment, a computer 500 acting as a server may lack a keyboard 510, pointing device 514, graphics adapter 512, and/or display 518. Moreover, the storage device 508 can be local and/or remote from the computer 500 (such as embodied within a storage area network (SAN)).

As is known in the art, the computer 500 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 508, loaded into the memory 506, and executed by the processor 502.

Embodiments of the physical components described herein can include other and/or different modules than the ones described here. In addition, the functionality attributed to the modules can be performed by other or different modules in other embodiments. Moreover, this description occasionally omits the term "module" for purposes of clarity and convenience.

Additional Configuration Considerations

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for inferring the presence of entities in identifier spaces. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus disclosed herein without departing from the spirit and scope as defined in the appended claims.

What is claimed is:

1. A method comprising:
   identifying an archetypical set of entities that operate in a first identifier space and do not operate in a second identifier space, the archetypical set of entities having a first criteria;
   identifying a standard set of entities that operate in a first identifier space and do not operate in a second identifier space, at least one of the standard set of entities not having the first criteria;
   identifying a combined set of entities that operate in the first identifier space and operate in the second identifier space;
   identifying a first set of features that distinguishes the archetypical set of entities from the standard population and identifying a second set of features that distinguishes the combined set of entities from the standard population;
   building a model associated with the first identifier space based on the first set of features and the second set of features;
   applying the model to a target entity that operates in the first identifier space to determine a likelihood that the target entity also operates in the second identifier space; and
   responsive to the likelihood being high, serving an advertisement having content specific to the second identifier space to the target entity in the first identifier space.

2. The method of claim 1, wherein the first identifier space is an internet browser space and the second identifier space is a mobile identifier space.

3. The method of claim 1, wherein the first identifier space is an internet browser space and the second identifier space is a digital television space.

4. The method of claim 1, wherein the first identifier space is an internet browser space and the second identifier space is gaming system space.

5. The method of claim 1, wherein the first identifier space is an internet browser space and the second identifier space is an in-vehicle system space.

6. The method of claim 1, wherein the first identifier space is an internet browser space and the second identifier space is a platform user login space.

7. The method of claim 1, wherein the first identifier space is an internet browser space and the second identifier space is an offline identifier space.

8. The method of claim 1, wherein the first identifier space is a mobile identifier space and the second identifier space is an internet browser space.

9. The method of claim 1, wherein applying the model to the target entity comprises:
computing a first score indicative of the similarity between the target entity and the archetypical set of entities by comparing a consumption history associated with the target entity with the first set of features;
computing a second score indicative of the similarity between the target entity and the combined set of entities by comparing a consumption history associated with the target entity with the second set of features;
comparing the first score and the second score to determine the likelihood of the target entity also operating in the second identifier space, wherein the first score being higher than the second score indicates that the likelihood of the target entity also operating in the second identifier space is lower than when the second score is higher than the first score.

10. A non-transitory computer readable storage medium storing processor-executable instructions, the instructions configured to be executed by the processor to implement a method comprising:
identifying an archetypical set of entities that operate in a first identifier space and do not operate in a second identifier space, the archetypical set of entities having a first criteria;
identifying a standard set of entities that operate in a first identifier space and do not operate in a second identifier space, at least one of the standard set of entities not having the first criteria;
identifying a combined set of entities that operate in the first identifier space and operate in the second identifier space;
identifying a first set of features that distinguishes the archetypical set of entities from the standard population and identifying a second set of features that distinguishes the combined set of entities from the standard population;
building a model associated with the first identifier space based on the first set of features and the second set of features;
applying the model to a target entity that operates in the first identifier space to determine a likelihood that the target entity also operates in the second identifier space; and
responsive to the likelihood being high, serving an advertisement having content specific to the second identifier space to the target entity in the first identifier space.

11. The medium of claim 10, wherein the first identifier space is an internet browser space and the second identifier space is a mobile identifier space.

12. The medium of claim 10, wherein the first identifier space is an internet browser space and the second identifier space is a digital television space.

13. The medium of claim 10, wherein the first identifier space is an internet browser space and the second identifier space is gaming system space.

14. The medium of claim 10, wherein the first identifier space is an internet browser space and the second identifier space is an in-vehicle system space.

15. The medium of claim 10, wherein the first identifier space is an internet browser space and the second identifier space is a platform user login space.

16. The medium of claim 10, wherein the first identifier space is an internet browser space and the second identifier space is an offline identifier space.

17. The medium of claim 10, wherein the first identifier space is a mobile identifier space and the second identifier space is an internet browser space.

18. The medium of claim 10, wherein applying the model to the target entity comprises:
computing a first score indicative of the similarity between the target entity and the first set of entities by comparing a consumption history associated with the target entity with the first set of features;
computing a second score indicative of the similarity between the target entity and the second set of entities by comparing a consumption history associated with the target entity with the second set of features;
comparing the first score and the second score to determine the likelihood of the target entity also operating in the second identifier space, wherein the first score being higher than the second score indicates that the likelihood of the target entity also operating in the second identifier space is lower than when the second score is higher than the first score.

19. A system comprising:
a processor; and
a computer readable storage medium storing processor-executable computer program instructions, the computer program instructions comprising instructions for:
identifying an archetypical set of entities that operate in a first identifier space and do not operate in a second identifier space, the archetypical set of entities having a first criteria;
identifying a standard set of entities that operate in a first identifier space and do not operate in a second identifier space, at least one of the standard set of entities not having the first criteria;
identifying a combined set of entities that operate in the first identifier space and operate in the second identifier space;
identifying a first set of features that distinguishes the archetypical set of entities from the standard population and identifying a second set of features that distinguishes the combined set of entities from the standard population;
building a model associated with the first identifier space based on the first set of features and the second set of features;
applying the model to a target entity that operates in the first identifier space to determine a likelihood that the target entity also operates in the second identifier space; and
responsive to the likelihood being high, serving an advertisement having content specific to the second identifier space to the target entity in the first identifier space.

20. The system of claim 19, wherein the first identifier space is an internet browser space and the second identifier space is a mobile identifier space.

* * * * *